United States Patent [19]

Kori et al.

[11] Patent Number: 4,617,714
[45] Date of Patent: Oct. 21, 1986

[54] PROCESS AND APPARATUS FOR FINISHING A GUIDE ROLLER

[75] Inventors: Takuaki Kori, Kanagawa; Hirotaka Ozawa; Shiro Sugawara, both of Tokyo, all of Japan

[73] Assignee: Sony Corporation, Tokyo, Japan

[21] Appl. No.: 741,796

[22] Filed: Jun. 6, 1985

[30] Foreign Application Priority Data

Jun. 14, 1984 [JP] Japan ................. 59-127704

[51] Int. Cl.$^4$ ............ B23P 19/00; B21D 53/00; B21B 27/00; B23B 3/00
[52] U.S. Cl. ................................ 29/434; 29/33.52; 29/149.5 PM; 29/240; 29/557; 29/724; 29/110; 82/1 C; 82/40 R; 82/101
[58] Field of Search ............... 29/149.5 PM, 240, 434, 29/557, 558, 724, 33.52, 110, 116 R, 129.5, 130, 132, DIG. 26, DIG. 31; 82/1 C, 101, 40 R

[56] References Cited

U.S. PATENT DOCUMENTS

| 2,372,203 | 3/1945 | Hensel et al. | 29/149.5 PM X |
| 3,541,905 | 11/1970 | Mey | 82/101 X |
| 3,572,199 | 3/1971 | Harden | 82/101 |
| 4,205,566 | 6/1980 | Molnar | 82/101 |

Primary Examiner—Howard N. Goldberg
Assistant Examiner—Ronald S. Wallace
Attorney, Agent, or Firm—Lewis H. Eslinger; Alvin Sinderbrand

[57] ABSTRACT

A process and apparatus for finishing the surface of a guide roller uses a drive belt under tension to ensure a uniform surface finish. Prior to surface machining, bearings at el. are inserted into the central bore of a guide roller sleeve to form a guide roller assembly. The assembly is mounted loosely on a stationary shaft and driven to rotate by an endless drive belt at a known tension. A cutting bit machines the outer surface of the sleeve as it rotates. The bit pressure against the sleeve is less than the frictional force of engagement between the guide roller and the belt.

13 Claims, 5 Drawing Figures

PROCESS AND APPARATUS FOR FINISHING A GUIDE ROLLER

BACKGROUND OF THE INVENTION

The present invention relates generally to a process for manufacturing precision guide rollers for video tape recorders (VTR). More specifically, the invention relates to a high-precision cutting process in guide roller production. The present invention further relates to an apparatus which performs the process according to the invention.

In general, a guide roller comprises a cylindrical guide roller sleeve with annular bearing and and oil-seal inserted into an axial opening through the roller sleeve. The bearing is made of a sintered metal impregnated with oil. Such guide rollers, particularly guide rollers for VTR's and so forth, which will be referred to hereafter as "VTR guide rollers", must be machined to a smooth and very even surface finish.

Various attempts have been made to provide satisfactorily precise surfacing processes for VTR guide rollers. Conventional manufacturing processes for VTR guide rollers have unsatisfactorily low yields, resulting in high production costs.

SUMMARY OF THE INVENTION

Therefore, it is an object of the invention to provide a process by which guide rollers can be fabricated with a satisfactorily even surface finish and at a satisfactorily high yield.

Another and more specific object of the invention is to provide a process for surfacing the VTR guide roller at a relatively high production rate and relatively inexpensively.

A further object of the invention is to provide an apparatus for performing the process according to the present invention.

In order to accomplish the above-mentioned and other objects, a process for fabricating guide rollers according to the present invention includes a step of attaching roller bearings to a guide roller sleeve to form a guide roller assembly prior to surfacing operations, driving the guide roller assembly to rotate, and finishing the outer surface of the guide roller sleeve by means of a machining bit.

Assembling the guide roller assembly prior to surface machining avoids degradation of the finished surface during the assembly process, which is conventionally performed after surfacing the guide roller sleeve. Also, by driving the guide roller assembly to rotate, e.g. by means of a driving belt, surfacing is made simpler and does not require highly qualified or skilled personnel. Furthermore, according to the process of the present invention, the guide rollers can be manufactured at a high yield.

In accordance with one aspect of the invention, a process for finishing a guide roller comprises the steps of:

forming a pre-assembly of a guide roller and a bearing:
rotatably supporting said pre-assembly;
driving said pre-assembly to rotate about a stationary axis by means of a driving belt; and
machining the outer surface of said pre-assembly to a predetermined radius by means of a machining bit in contact with said assembly at a diametrically opposite to the point of contact between said belt and said assembly.

According to another aspect of the invention, a process for finishing the surface of a guide roller having a central bore for accommodating bearings and/or lubricating elements, comprises, in the order stated, the following steps:

(a) inserting bearings into the central bore of a guide roller, thus finishing an assembly;

(b) mounting the assembly on a stationary shaft of smaller diameter than the inner diameter of the bearings so that the assembly is free to rotate around the shaft;

(c) driving the assembly to rotate by means of a rotating belt engaging the outer surface of the assembly at a known point of contact and at a given tension; and (d) machining the outer surface of the assembly to a desired finished radius by means of a machining bit in contact with the assembly at a point diametrically opposite the point of contact between the belt and the assembly and at a contact pressure less than the given belt engagement tension.

In order to accomplish the aforementioned object, an apparatus for finishing guide rollers includes a support rotatably supporting the guide roller assembly, and, a driving belt which drives the guide roller assembly to rotate. A cutting tool is mounted opposite the guide roller assembly supported by the support and can be moved toward and away from the guide roller assembly for machining.

In accordance with a further aspect of the invention, an apparatus for finishing the surface of a guide roller having a central bore accommodating bearings and/or lubricating elements, comprises a shaft passing through the guide roller and through bearings received within the central bore of the guide roller, a drive belt in frictional engagement with the guide roller at a known belt pressure, means driving the drive belt to rotate, thereby driving the guide roller to rotate about the shaft, and a cutting bit for machining the surface of the guide roller to a desired radius, the cutting bit being brought into contact with the surface of the guide roller at a given bit pressure less than the belt pressure and at a point diametrically opposite the point of contact between the belt and the guide roller.

BRIEF DESCRIPTION OF THE DRAWINGS

The present invention will be understood more fully from the detailed description of the invention given below and from the accompanying drawings of the preferred embodiment of the invention, which, however, should not be taken to limit the invention to the specific embodiments of the invention, but are for explanation and understanding only.

In the drawings.

DESCRIPTION OF THE PREFERRED EMBODIMENT

Before a detailed description of the preferred embodiment of the invention is presented, a typical guide roller 1 will be described with reference to FIGS. 1 and 2 for better understanding.

Figure 1:
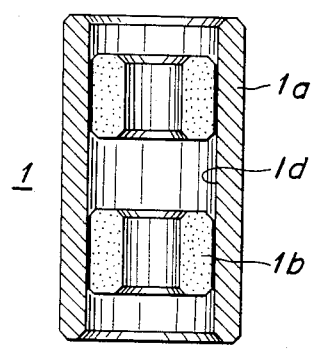
FIG. 1 is a longitudinal section through a typical guide roller produced by the finishing process according to the present invention.

As shown in FIG. 1, the guide roller 1 comprises a cylindrical guide roller sleeve 1a and stationary bearings 1b. The stationary bearings 1b are pressed into the axial through opening 1d of the guide roller sleeve 1a. The bearings 1b are made of a sintered metal impregnated with oil. A roller shaft 2 passes through the bearings 1b and rotatably supports the guide roller sleeve 1a. Oil-seals 1c are then inserted into either end of the through opening 1d. The guide roller sleeve 1a, the bearings 1b, the oil-seals 1c and the roller shaft 2 constitute a guide roller assembly.

Figure 3:
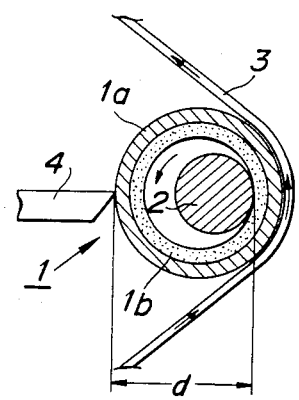
FIG. 3 is a cross section through the guide roller assembly taken during surfacing.

FIG. 3 illustrates the fundamental concepts of the preferred embodiment of a finishing process for guide rollers according to the invention by which the guide roller sleeve 1a can be surfaced with high uniformity. During the finishing process, the guide roller assembly is driven by a driving belt 3 which passes over the outer surface of the guide roller sleeve 1a. The driving belt 3 presses against the outer surface of the guide roller sleeve with a given tension. The tension on the driving belt 3 is referred to hereafter as "belt pressure".

A cutting bit 4 opposes the outer surface of the guide roller sleeve and is held against the opposing surface of the guide roller sleeve at a given pressure. This section of the outer surface of the guide roller sleeve 1a is referred to hereafter as "cutting section", and diametrically opposes the point of contact between the driving belt 3 and the outer surface of the guide roller sleeve 1a. The given pressure at which the bit 4 engages the outer surface of the guide roller sleeve is referred to hereafter as "bit pressure".

In FIG. 3, the label d represents the distance between a point on the inner surface of a bearing 1b to a diametrically opposing point on the outer surface of the guide roller sleeve. As will be appreciated from FIG. 3, the diameter of the roller shaft 2 is smaller than the inner diameter of the bearings 1b. Although it is not shown in FIG. 3, the roller shaft 2 is supported rigidly at both ends by a suitable supporting means, so that the roller shaft will not move during finishing.

Theoretically, assuming the belt pressure on the guide roller sleeve 1a is substantially greater than the bit pressure, the guide roller sleeve 1a will be held against the bit 4 at a constant pressure while the distance d remains constant. In this case, the entire outer surface of the guide roller sleeve will be machined evenly by the cutting bit.

In practice, surfacing uniformity is influenced by:
circularity of the inner surface of the bearings 1b and the outer surface of the roller shaft;
roughness of the inner surface of the bearings 1b and the outer surface of the roller shaft; and
clearance between the inner surface of the bearings 1b and the outer surface of the roller shaft 2.

Therefore, in order to ensure satisfactory surface uniformity, the circularity, the roughness and clearance must all be well adjusted.

In addition, the following considerations are essential to achieving a uniform surface finish:
the diameter of the roller shaft in relation to the inner diameter of the bearing 1b;
the material of the roller shaft in relation to that of the bearing 1b;
a suitable tool bit with respect to the material of the guide roller sleeve;
a suitable driving mechanism for the guide roller sleeve, i.e. material, width and thickness of the belt, tension on the belt, angle of contact between the belt and the outer surface of the guide roller sleeve, and the drive motor; and
cutting conditions, i.e. cutting speed, feed rate and cutting depth, in relation to the material of the guide roller sleeve.

Once the conditions set forth above have been suitably selected, the guide roller sleeve can be very evenly finished.

Figure 4:
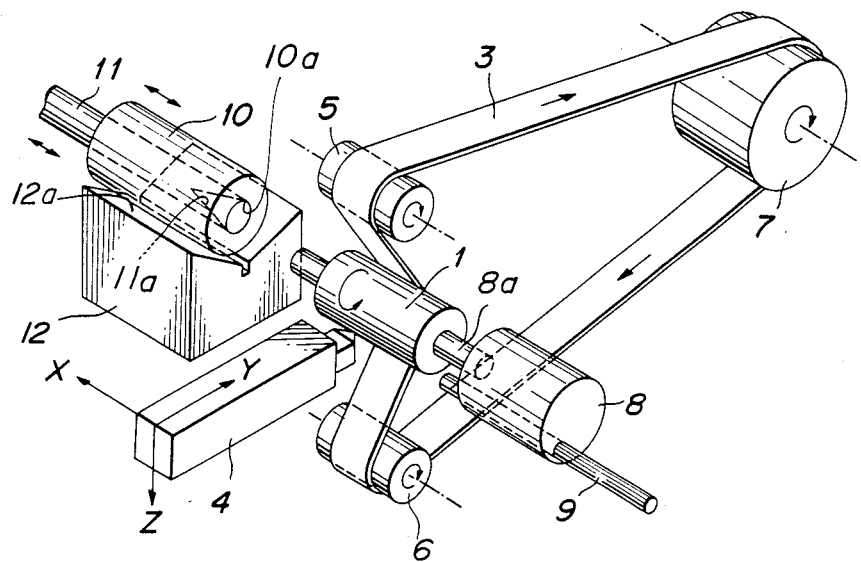
FIG. 4 is a perspective view of the preferred embodiment of an apparatus performing the process of the invention.

FIG. 4 shows the essential elements of an apparatus for finishing guide rollers in accordance with the present invention. The apparatus includes a support shaft 8a extending from a holder 8. A eject rod 9 also extends through a hole in the holder 8. Although it is not clearly shown in FIG. 4, the holder 8 is stationarily secured to the apparatus so as to define the stationary rotational axis of the guide roller sleeve 1a while the rod 9 is free to move axially. A work base 12 opposes the holder 8. The work base 12 has an essentially V-shaped top 12a on which the guide roller sleeve with the bearing 1b is to be mounted in the initial stages of the surfacing operation.

A push rod 10 and a coaxial boss 11 are movable axially toward and away from the holder 8 independently of each other. The push rod 10 rests on the V-shaped top 12a of the work base 12 and is used to push the guide roller sleeve 1a with the bearings 1b onto the support shaft 8a extending from the holder 8. When the guide roller sleeve 1 is placed on the work base 12, it is essentially coaxial with the support shaft 8a. Similarly, the boss 11 can pass through a central bore 10a through the push rod 10. At one extreme of travel of the boss 11, the end opening 11a thereof engages the free end of the support shaft 8a so as to stationarily support the latter.

The driving belt 3 is wound around a driving pulley 7 and upper and lower tension pulleys 5 and 6. These pulleys 5, 6 and 7 may be journalled on the apparatus. The driving pulley 7 is driven by a drive motor (not shown) through a suitable power transmission mechanism.

The pulleys 5, 6 and 7 may be mounted on a movable frame (not shown) for movement toward and away from the guide roller sleeve 1a mounted on the support shaft 8a.

The bit 4 is adjustably mounted on the apparatus for movement along the x-, y- and z-axes. The x-axis of the bit 4 represents the direction of feed of the bit relative to the guide roller sleeve during machining. The y-position of the bit 4 determines the cutting depth during machining. The z-position adjustment may be necessary for height adjustment.

Before machining, the bearings 1b are pressed into the guide roller sleeve 1a. After this pre-assembly of the bearings 1b to the guide roller sleeve 1a, the guide roller sleeve 1a is mounted in the working section of the apparatus in a multi-step process. First, the guide roller pre-assembly is placed on the work base 12 such that the opening 1d is in alignment with the support shaft 8a. Thereafter, the push rod 10 is moved toward the holder 8 so as to drive the support shaft 8a through the through opening 1d of the guide roller sleeve 1a. Thereafter, the boss 11 is inserted through the central bore 10a of the push rod so as to engage the free end of the support shaft 8a.

During this initial mounting stage of the process, the upper and lower tension pulleys 5 and 6 are released so that the drive belt 30 is not held securely against the guide roller sleeve.

After mounting the guide roller sleeve 1a in the working section, the upper and lower tension rollers 5 and 6 are moved toward the guide roller sleeve 1a to tighten the drive belt 3 into contact with the guide roller sleeve 1a at the contact point at a predetermined pressure. Then, the driving pulley 7 is driven by the motor in the direction shown by the arrow in FIG. 4. The bit 4 is moved toward to the guide roller sleeve so as bring the cutting edge into contact with the guide roller sleeve 1a at a predetermined initial cutting section. The initial bit position is determined by the desired cutting depth. Then, the bit 4 is driven parallel to the longitudinal axis of the guide roller sleeve at a predetermined speed.

Preferably, the apparatus will be provided a rough finishing bit and a fine finishing bit at different positions along the z-axis. In this case, the rough finishing bit and the fine finishing bit are brought into contact with the outer surface of the guide roller sleeve in the stated order. It also possible to arrange the rough finishing bit and the fine finishing bit horizontally so that rough finishing and fine finishing can be performed in a single-step machining operation.

Although in the shown embodiment, the tension pulleys move toward and away from the work section in which the guide roller sleeve 1a is mounted, it would also be possible to provide stationary tension pulleys and a movable holder 8 and the boss 11 for shifting the guide roller sleeve 1a toward the drive belt 3 after mounting on the apparatus. In addition, in the above disclosure, the drive belt 3 is driven after engaging the outer surface of the guide roller sleeve 1a. However, it would also be possible to start driving the belt 3 before tensioning it onto the guide roller sleeve.

After the finishing operation is complete, the upper and lower tension pulleys 5 and 6 are moved away to release the drive belt 3 from the outer surface of the finished guide roller sleeve. Then, the ejecting rod 9 is driven into contact with the opposing edge of the guide sleeve 1a and pushes the latter back onto the work base 12 and off of the support shaft 8a. After returning to the work base 12, the finished guide roller sleeve is ejected from the apparatus and the next guide roller sleeve to be finished is supplied. The guide sleeves may be inserted and ejected by any conventional means which do not adversely affect their surface finish.

Experiments have been performed on the inventive apparatus to find operating conditions suitable for achieving the desired degree of surface uniformity. The results of these experiments show the following conditions to be crucial:

the axes of the support shaft 8a, the shafts of the upper and lower tension pulleys 5 and 6, the shaft of the driving pulley 7 must be parallel to within 1%;

the height of the bit 4 must be accurate to within the range of −0.01 mm to −0.05 mm;

at a cutting depth of 0.01 mm radius, cutting resistance (principal component) of a workpiece, i.e. the guide roller sleeve, made of C3601 brass must be a piece of approximately 150 g to 200 g meter/sec$^2$;

a lateral stabilizing pressure three to five times greater than the lateral pressure applied by the bit, which is greater than the cutting resistance is necessary; and tension on the belt 3, which is related to the lateral pressure P as expressed in the following equation:

$$P = 2T\sin\theta/2$$

where $\theta$ is the angle of contact of the belt, must be in the range of 300 g to 500 g meter/sec$^2$.

The above conditions may differ depending upon the size of the work piece, the sizes of the tension pulleys and the drive pulley, Young's modulus (expansion rate) of the drive belt 3, and the coefficient of friction of the belt and other conditions.

Experiments performed by the inventors have revealed that tapered guide rollers can also be surfaced by the process and apparatus of the present invention. In one experiment employing the above conditions, the sintered alloy bearings were pressed into a guide roller sleeve 4.55 mm in diameter and 8.1 mm long. From this pre-assembly, a tapered guide roller sleeve with a major diameter of 4.5 mm and a taper angle of 30' (minutes) was formed.

Furthermore, experiments have also revealed that when oil seals made of polyoxymethylene are used, no deformation of the guide sleeve occurs upon pressing the oil seals into the sleeve. This shows that it is possible to pre-assemble the oil seals together with the bearings as well as being installed in the finished sleeve after the surfacing operation.

Figure 5:
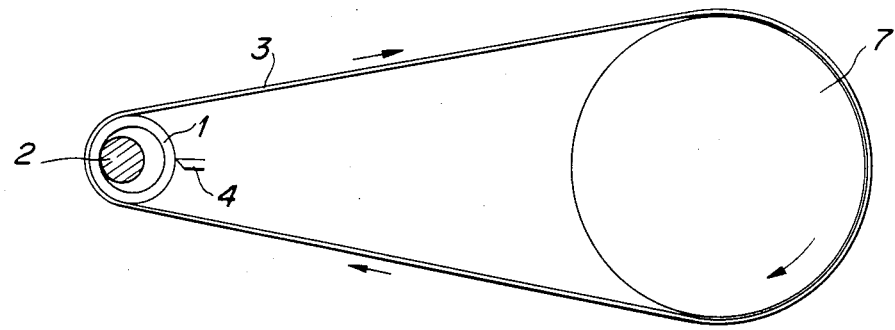
FIG. 5 is a fragmentary side elevation of another embodiment of the apparatus according to the invention.

FIG. 5 shows part of a second embodiment of the machining apparatus applicable to the process according to the invention. In this embodiment the tension pulleys of the foregoing first embodiment have been omitted. In this case, the belt is wound around the sleeve such that the contact point between the outer surface of the guide roller sleeve and the belt is on the opposite side from that of the first embodiment. The bit 4 again diametrically opposes the contact point. This arrangement has essentially the same effect, provided the aforementioned experimentally derived conditions are satisfied.

Figure 2:
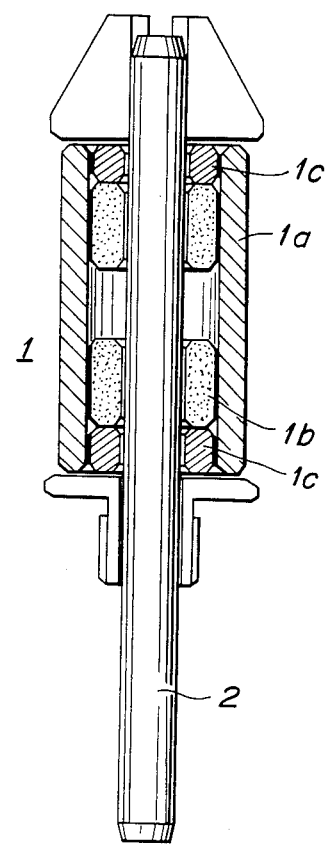
FIG. 2 is a longitudinal section through a guide roller assembly.

According to the present invention, it is also possible to use the roller shaft 2 of FIG. 2 as the support shaft. In this case, the opposite ends of the roller shaft will be retained by known suitable clamping or restraining means.

The process and apparatus according to the invention provides the following benefits:

highly uniform surface finish and high yield;

possible damage to the surface upon inserting the bearings into the guide roller sleeve is avoided by pre-assembling the bearings and the sleeve;

machining does not require highly qualified personnel;

the process can be easily adapted to computer control;

the apparatus can be compact;

since satisfactorily surface uniformity can be ensured merely by proper care of the belt and shafts, maintenance of the apparatus is greatly facilitated; and the degree of wear on the apparatus can be accurately anticipated.

Therefore, the present invention fulfills all of the objects and advantages sought therefor.

While the present invention has been disclosed in terms of the preferred embodiments of the invention, the invention should be appreciated to include all possible embodiments which do not depart from the principle of the invention set out in the appended claims.

What is claimed is:

1. A process for finishing a guide roller comprising the steps of:
   forming a pre-assembly of a guide roller and a bearing;
   rotatably supporting said pre-assembly;
   driving said pre-assembly to rotate about a stationary axis by means of a driving belt; and
   machining the outer surface of said pre-assembly to a predetermined radius by means of a machining bit in contact with said assembly at a point diametrically opposite to the point of contact between said belt and said assembly.

2. The process as set forth in claim 1, which includes a step of providing a driving pulley for driving said driving belt with said driving pulley and stationary axis being parallel to within 1%.

3. The process as set forth in claim 1, in which said driving belt exerts lateral stabilizing pressure on said pre-assembly that is greater than a pressure applied by said bit.

4. The process as set forth in claim 3, wherein said lateral stabilizing pressure is three times to five times greater than said pressure applied by said bit.

5. The process as set forth in claim 1, wherein cutting resistance of said bit is adjusted to a force approximately 150 g to 200 g meter/sec$^2$.

6. The process as set forth in claim 1, wherein tension of said driving belt is adjusted within a range of force approximately 300 g to 500 g meter/sec$^2$.

7. A process for finishing the surface of a guide roller having a central bore for accommodating at least one element chosen from the group comprising bearings and lubricating elements, comprising the steps of:
   (a) inserting bearings into the central bore of a guide roller, thus finishing an assembly;
   (b) mounting the assembly on a stationary shaft of smaller diameter than the inner diameter of the bearings so that the assembly is free to rotate around the shaft;
   (c) driving the assembly to rotate by means of a rotating belt engaging the outer surface of the assembly at a known point of contact and at a given tension; and
   (d) machining the outer surface of the assembly to a desired finished radius by means of a machining bit in contact with the assembly at a point diametrically opposite the point of contact between the belt and the assembly and at a contact pressure force less than a force caused by the belt engagement tension.

8. The process as set forth in claim 7, wherein said mounting step comprises the steps of:
   (b1) placing the assembly on a work base by which the assembly is coaxially aligned with a stationary shaft;
   (b2) driving the assembly axially until it engages the shaft and disengages from the work base; and
   (b3) restraining the assembly axially to ensure it remains engaged with the shaft while allowing rotation of the assembly about the shaft.

9. An apparatus for finishing the surface of a guide roller having a central bore accommodating at least one element chosen from the group comprising bearings and lubricating elements, comprising:
   a shaft passing through the guide roller and through bearings received within the central bore of the guide roller;
   a drive belt in frictional engagement with the guide roller at a known belt pressure;
   means driving said drive belt to rotate, thereby driving the guide roller to rotate about said shaft; and
   a cutting bit for machining the surface of the guide roller to a desired radius, said cutting bit being brought into contact with the surface of the guide roller at a given bit pressure less than said belt pressure and at a point diametrically opposite the point of contact between said belt and the guide roller.

10. The apparatus as set forth in claim 9, further comprising means for mounting the guide roller on said shaft and means for removing the finished guide roller from said shaft upon completion of the machining by the cutting bit.

11. The apparatus as set forth in claim 10, wherein said mounting means comprises a work base configured so as to hold the guide roller in axial alignment with said shaft, and a boss coaxial with a guide roller resting on the work base and movable axially so as to push the guide roller into engagement with said shaft, and said removing means comprises a rod opposing the end of the guide roller distal said boss and movable axially so as to push the guide roller out of engagement with said shaft.

12. The apparatus as set forth in claim 9, wherein said surface of the guide roller is in contact with an internal surface of said drive belt.

13. The apparatus as set forth in claim 9, wherein said driving means comprises a motor-driven main drum and a pair of tensioning pulleys, all being in contact with an internal surface of said drive belt, and wherein said surface of the guide roller is in contact with an external surface of said drive belt at a point intermediate said tensioning pulleys.

* * * * *